July 3, 1928.  1,676,181
F. W. FRITCHEY
BEARING
Filed April 16, 1927   3 Sheets-Sheet 1
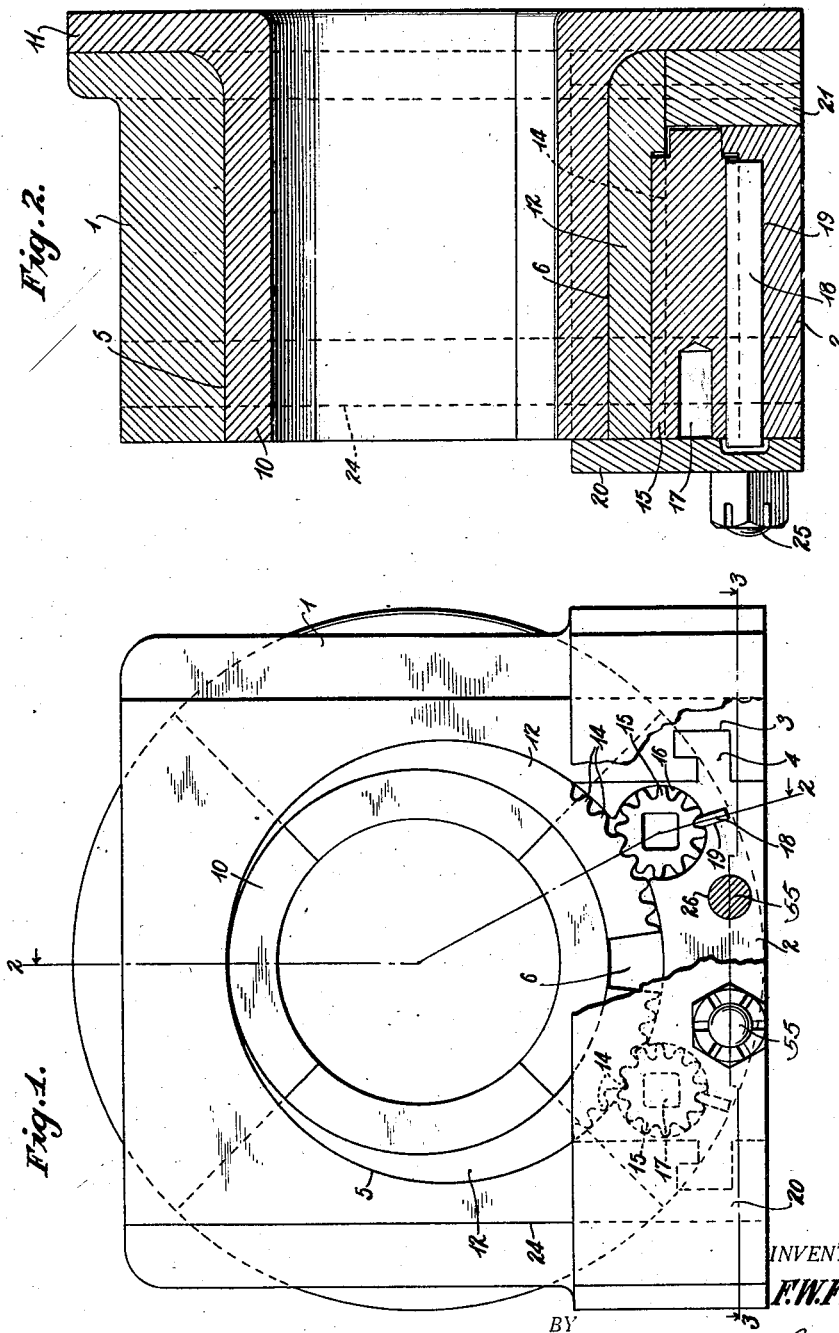
INVENTOR.
F. W. Fritchey
BY
Knight Bros
ATTORNEYS

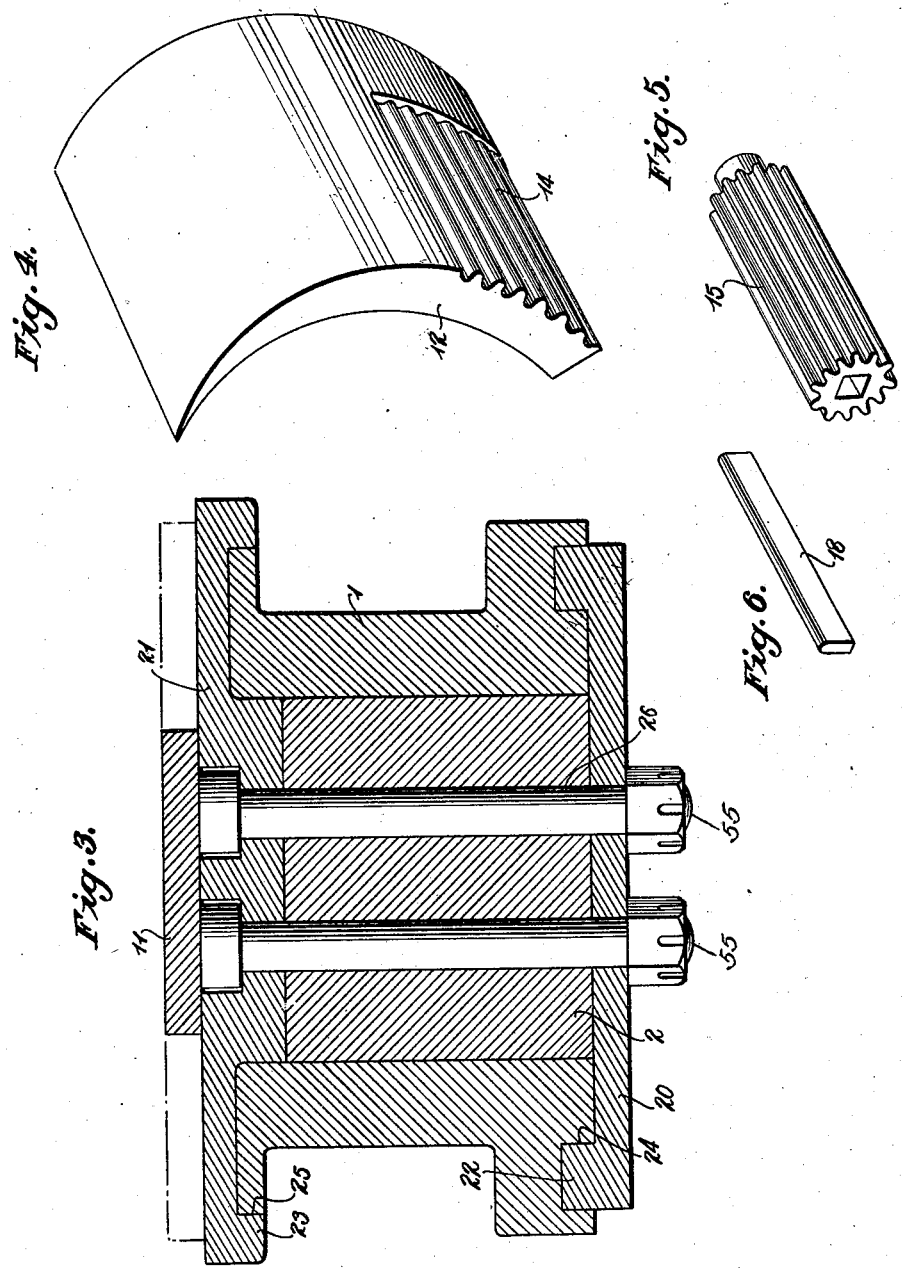

July 3, 1928.
F. W. FRITCHEY
BEARING
Filed April 16, 1927
1,676,181
3 Sheets-Sheet 3
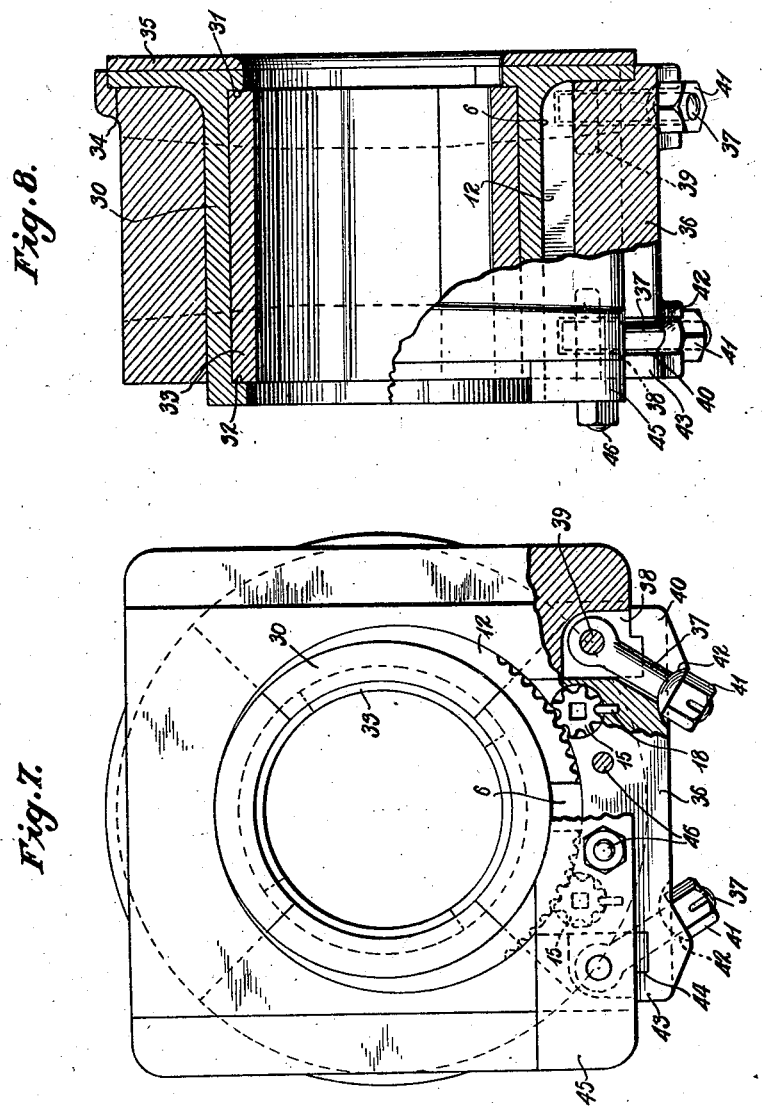
INVENTOR.
F. W. Fritchey
BY Knight Bros
ATTORNEYS Patented July 3, 1928.

1,676,181

UNITED STATES PATENT OFFICE.

FRANKLIN W. FRITCHEY, OF CUMBERLAND, MARYLAND.

BEARING.

Application filed April 16, 1927. Serial No. 184,270.

This invention relates to an adjustable or "take up" bearing, particularly applicable to locomotive driving boxes.

One object of the invention is to provide a bearing for locomotives and other machines which can be adjusted and kept to a neat fit to the journal, thereby eliminating the present prevailing severe shocks and pounds.

Another object is to provided a means of complete renewal of these bearings, likewise, the renewal of the end bearings or lateral faces for the purpose of taking up excessive end play.

Another object is to provide means whereby all such renewals and adjustments can be made without dropping wheels, or in other words without removing the driving wheels from the frames of a locomotive or similar machine.

The present general practice in making a locomotive driving box is as follows:

Practically all driving boxes are made of cast iron or cast steel, mostly cast steel. These are machined in the usual manner, and within them in the upper part there is forced or pressed what is termed a "quarter moon or crescent shaped crown" brass or bearing. This bearing encircles just about one half the circumference of the journal. These brass bearings are forced into the boxes with hydraulic pressures varying from 30 to 70 tons. As a result of this process the box is spread at the bottom or open end varying from ¼ to ½ inch. After the brasses are forced in, the boxes are machined and the shoe and wedge faces are made parallel.

After the driving boxes are completed and applied and the locomotive placed in service, and during the initial trial trips when the bearings are being broken in, these boxes all heat to more or less extent, as a result of which they tend to relieve themselves from the strain of having the crown brass forced into them. In consequence each box closes in on the brass and the brass in the heated state being more pliable is forced or pinched against the journal, this causing further heat and friction and through this process the journal must naturally grind the brass away in order to free itself, resulting in an enlarged and pounding bearing. Also through this same process the box has distorted itself to such an extent that the shoe and wedge faces are out of parallel the amount the box has closed at the bottom or open end. This also further causes a pounding condition of these bearings due to the box faces being tapering within parallel shoe and wedge faces. The usual present remedy for this condition is to remove the wheels and put the boxes and parts through the previous process of renewal with no assurances of the same programme not repeating itself. Therefore, the present practice is not only very costly, but also there can be no assurance of permanency as against knocks and pounds to even a small degree. The most detrimental feature from this pounding condition is the damage to main frames and other parts as a result of the severe shocks from such pounding.

Also under present practice when the lateral or hub face end of the bearing has become worn to the condemning limit as prescribed by the rules of the I. C. C. laws, namely:—¾ inch, the present remedy requires the removal of the wheels and boxes to make the necessary repairs.

The above mentioned disadvantages are eliminated by my improvement.

In the accompanying drawing certain embodiments of my invention are shown by way of example.

Fig. 1 is a front view of a box and bearing in accordance with my invention, parts being broken away, Fig. 2 is a vertical section on the line 2—2 of Fig. 1, Fig. 3 is a horizontal section on the line 3—3 of Fig. 1, Figs. 4, 5 and 6 are detail views of parts used in the device shown in Fig. 1, Fig. 7 is a front view of a modified form with parts broken away, and Fig. 8 is a side view partly in section of the device shown in Fig. 7.

Ordinarily my improvement can be applied or adapted to present or prevailing designs of locomotive driving boxes. The drawing shows a driving box used in ordinary practice, with this proposed improvement adapted to same. The box consists of a substantially U-shaped body portion 1 and a filler block 2. The body portion has grooves 3 into which slide tongues 4 of the filler block, the tongues and grooves being so shaped as to prevent lateral spreading of the sides of the box. The inner walls of the body portion 1 and filler block 2 form a circular supporting surface 5 for the bearing parts which will now be described.

It will be observed that instead of using the old crescent shaped crown brass for the bearing that a complete bushing shaped piece of brass 10 is used, this completely encircling the axle. This bushing has a flanged section 11 at the outer end which provides the face for hub or lateral end play wear. This flanged bushing is separated into sections, ordinarily four of such sections being provided, this for the purpose of ready removal without the removal of the wheels and other parts, as well as for the purpose of being able to cut down or narrow the sections, when so removed, to take up for wear. In other words, when they have become worn from journal wear they can be closed to form a closer or proper fit to the journal. Further, when such process has proceeded to the maximum, these sections can then be renewed, this also without the removal of wheels and other parts. Also, this provision for the renewal of the sections provides a means of remedying end play wear when such has progressed to the condemning limit, this also without the removal of wheels.

The diameter of the outer periphery of the bushing 10 is smaller than the diameter of the circular bearing surface 5, and within the space between the two there is arranged a steel crescent or eccentric shaped bushing 12, this being in two sections, separated at the top and bottom. The thin section of each half is at the top and the heavy or thicker section at the bottom. These steel bushings called hereinafter the two circular wedges, have the particular function of holding the brass bushing sections in place in a substantial and secure manner. A sufficient opening is provided at top and bottom between the ends of the circular wedges to allow for their movement either way, to close in tightly upon the brass bushing or to open for easy removal of the parts. Means are provided for moving the circular wedges up and down in circular fashion. This may take the form, as shown in the drawing, of a segment of gear teeth 14 machined into the outer face of the lower or thick part of the wedges, and spindle pinions 15 meshing into these gear teeth. These spindle pinions are revolubly mounted in bored recesses 16 in the filler block 2 and have a portion or section of their teeth projecting outside of the bored recesses to provide engagement with the teeth of the circular wedges.

Each spindle pinion has a square hole 17 at one end within which a plug wrench can be inserted for rotating the pinions to move the circular wedges one way or the other as the occasion requires.

After adjustments are made and all parts set, the spindle pinions are locked in position by means of a key 18 inserted in a slot 19 which coincides with one of the spaces between the teeth of the pinion. A locking wedge 6 of proper width may then be inserted between the lower ends of the circular wedges.

The filler block 2 is a steel piece which occupies the space where at present the oil or grease cellar is ordinarily located. With this proposed improvement, the oil or grease cellar is abolished for the reason that since the bushing bearing completely encircles the axle, a cellar would be useless, and therefore other means of lubrication are provided. This can consist of means for forcing oil or grease into the bearing under pressure.

To supplement the tying in of the sides of the box by the filler block binding plates 20 and 21 are provided which have offset portions 22 and 23 respectively adapted to engage with a draw fit over the shoulders 24 and 25 of the box. The binding plates are held in place by tie bolts 55 extending through the binding plates and through holes 26 in the filler block.

The above described type of bearing has numerous advantages, among which may be mentioned the following:

It provides means for taking up wear without removing the wheels or boxes from the main frame.

The bearing bushing can be shifted in the box so that the greatest possible wear of the entire area of the bearing before renewal is obtained, this without the removal of wheels or boxes from the frame.

The bearing can be renewed after maximum wear both circumferentially and laterally without removal of wheels or boxes from the frames.

The bearing can be kept to a close fit to the journal, thereby eliminating the destructive shocks and pounds transmitted to the other structural parts of the machine as prevails with present practice.

With this bearing the running is smoother and the machine can be more economically maintained because the bearing completely encircles the axle, providing a greater area of bearing where most needed, that is, fore and aft, to take the end thrusts of the piston and main rods. Furthermore the bearing completely encircling the journal provides a better means of retaining the lubrication entirely around the journal.

Means are provided for remedying lateral or end wear by either renewal of bearing sections or by reclaiming the same by building up, by welding, the worn hub faces, all without the removal of the wheels.

The driving box is of substantial construction capable of absorbing strains thrust upon the same, thereby lessening liability of breakage.

The driving box is constructed and held together in such a manner that the shoe and wedge faces remain parallel, thus eliminating another of the causes of knocks and pounds such as prevail when these faces are not parallel.

In Figs. 7 and 8 I have shown a modified form of my improvement in which a floating bushing is used.

A sectional steel bushing 30 is provided with shoulders 31, 32 within which is held a sectional brass floating bushing 33. Upon the flange 34 of the steel bushing is secured, preferably by spot welding, a brass or bronze end thrust plate 35.

The circular wedges 12 and adjusting pinions 15 are also used in this modification.

A different form of filler block and fastening means therefor is shown in Figs. 7 and 8. In this case the filler block 36 is supported by eye-bolts 37 pivoted in slots 38 in the sides of the box upon pins 39. The eye-bolts slip into slots 40 of the filler block and are held in place by nuts 41 engaging the shoulders 42. The filler block has offset portions 43 engaging shoulders 44 of the sides of the box.

Binding plates may also be used with this modification, but the drawing shows simply a security plate 45, held in place by bolts 46, for holding the spindle pinions 15, the locking wedge 6 and the keys 18 in position.

It will be understood that it may be possible or necessary to employ other detail methods to secure the filler block in driving boxes of special extraordinary design, however, the two methods shown should suffice in general practice or ordinary designs.

In this arrangement of floating type of bearing it will be understood that the feature of take up and closing for wear of the sectional brass bushing does not prevail, however, when these floating sections become worn to the extent of requiring renewal they can be readily and easily replaced. The main advantage and the one which is of great consequence is the fact that by reason of the sections of bushing 33 floating or revolving within the steel bushing 30, greater area of bearing is acquired, in fact, this area is increased two-fold, and in consequence wear is reduced proportionately; likewise liabilities of failures from overheat are reduced and practically eliminated.

As regards renewals and replacements of worn parts the same features and advantages will prevail in the matter of making these renewals without dropping the wheels from the frames.

Having described my invention, I claim:

1. In a locomotive driving box, a box consisting of a substantially U-shaped body and a detachable filler block bridging the ends thereof, the inner faces of said body and filler block presenting a circular supporting surface, a sectional annular bushing within said supporting surface of smaller outer diameter than the same, and circular wedges between said supporting surface and said bushing.

2. A device in accordance with claim 1 in which said body portion and filler block are secured together by interlocking tongues and grooves for preventing spreading of the sides of the body portion.

3. A device in accordance with claim 1 in combination with a binding plate adapted to bridge the ends of said substantially U-shaped body member, shoulders on the ends of said body member, offset portions of said binding plate adapted to engage said shoulders, and means for holding said binding plate in position.

4. In a locomotive driving box, a box consisting of a substantially U-shaped body and a detachable filler block bridging the ends thereof, the inner faces of said body and filler block presenting a circular supporting surface, a sectional annular bushing within said supporting surface of smaller diameter than the same, a flange on one end of said bushing adapted to take lateral thrust against the bearing, and circular wedges between said supporting surface and said bushing.

5. In a locomotive driving box, a box consisting of a substantially U-shaped body and a detachable filler block bridging the ends thereof, the inner faces of said body and filler block presenting a circular supporting surface, a sectional annular bushing of hard metal within said supporting surface, and of smaller outer diameter than the same, a floating bushing of softer bearing metal within said first mentioned bushing, and circular wedges between said supporting surface and said first mentioned bushing.

6. In a device of the class described, a bearing box having an inner circular supporting surface, an annular bushing of hard metal within said supporting surface and of smaller outer diameter than the same, a floating bushing of softer bearing metal within said first mentioned bushing, a flange on one end of said first mentioned bushing, an annulus of softer bearing metal secured to said flange, and circular wedges between said supporting surface and said first mentioned bushing.

7. In a locomotive driving box, a box having an inner circular supporting surface, a sectional annular bushing within said circular supporting surface and of smaller outside diameter than the same, and circular wedges between said supporting surface and said bushing, the sections of said bushing being of such circumferential length as to form a closed cylinder around the journal of the driving wheel.

The foregoing specification signed at Cumberland, Maryland, this 16th day of March, 1927.

FRANKLIN W. FRITCHEY.